Oct. 21, 1930.  G. FURMAN  1,779,230
MOLDING MACHINE
Filed Oct. 19, 1928  2 Sheets-Sheet 1
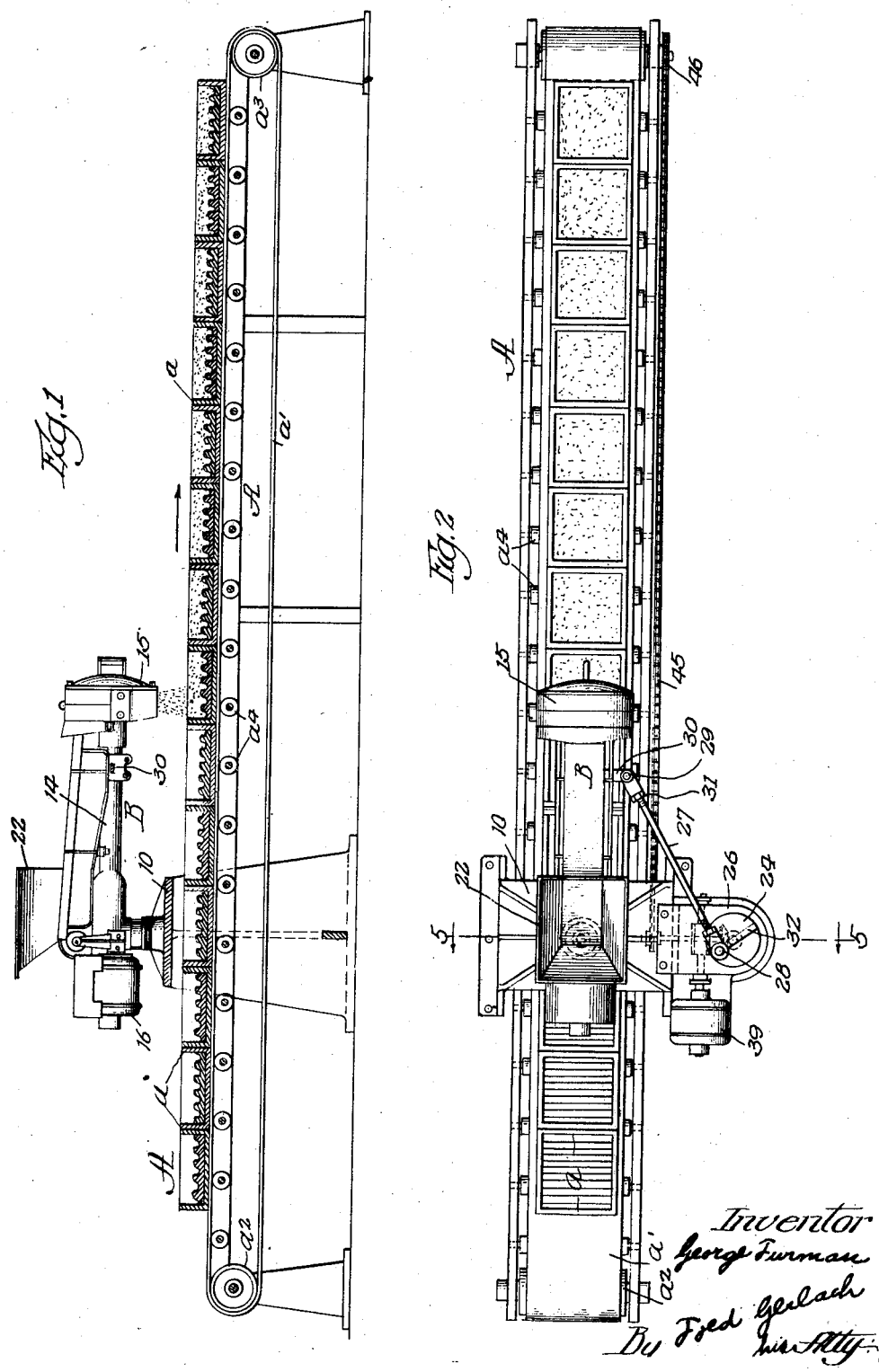

Oct. 21, 1930.                 G. FURMAN                    1,779,230
                              MOLDING MACHINE
                   Filed Oct. 19, 1928        2 Sheets-Sheet 2
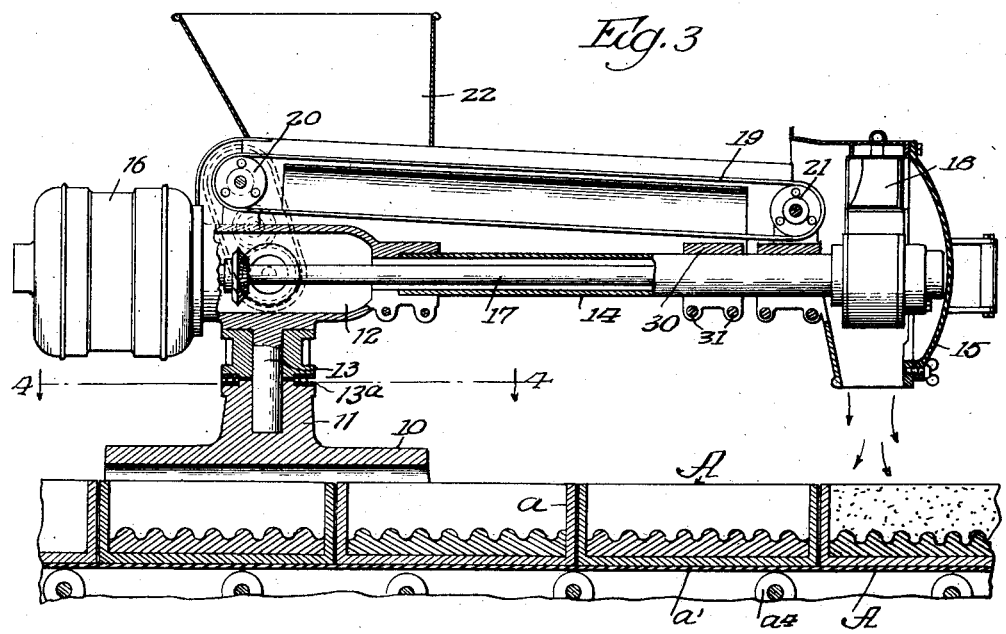
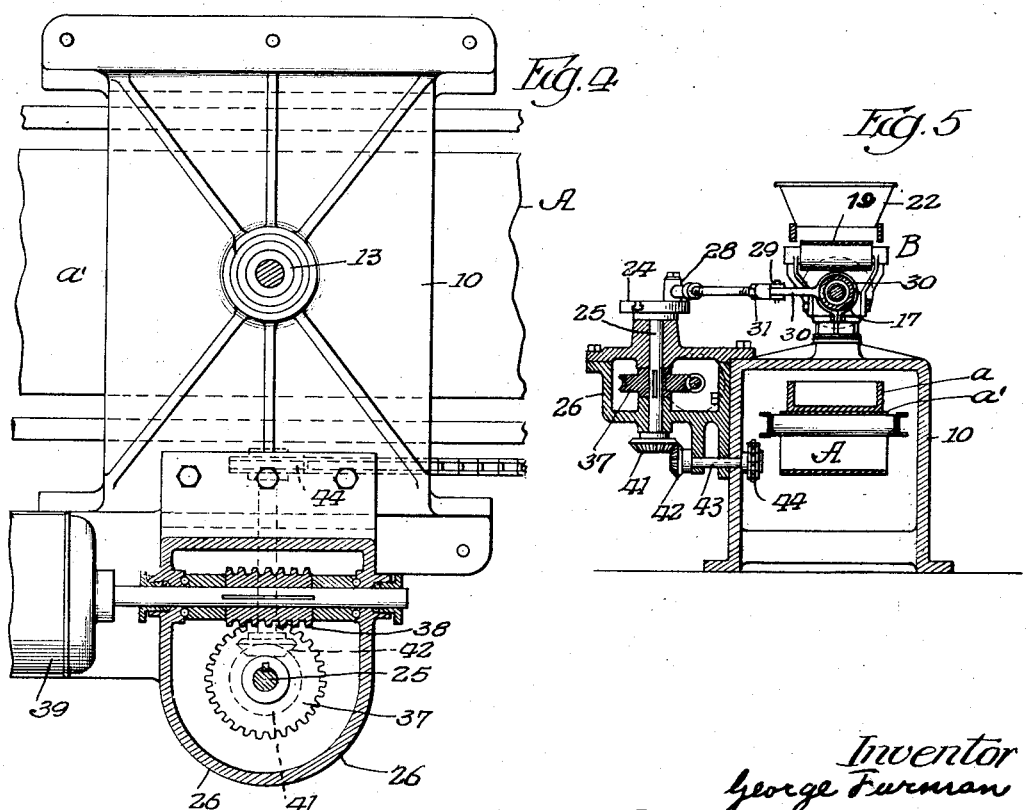
Inventor
George Furman
By Fred Gerlach
his Attys Patented Oct. 21, 1930

1,779,230

UNITED STATES PATENT OFFICE

GEORGE FURMAN, OF CHICAGO, ILLINOIS, ASSIGNOR TO THE BEARDSLEY & PIPER COMPANY, OF CHICAGO, ILLINOIS, A CORPORATION OF ILLINOIS

MOLDING MACHINE

Application filed October 19, 1928. Serial No. 313,415.

The invention relates to molding machines of the type in which a rotary projector is used to deliver, at high velocity, sand into flasks.

The object of the present invention is to provide a machine in which the projector-head is operated horizontally by power means to fill different portions of the flasks on a driven conveyor, and in which the movement of the conveyor is utilized in connection with the movement of the projector-head to fill all portions of the flasks.

Another object of the invention is to provide improved means for swinging a jib, on which the projector head is stationarily pivoted to cause all portions of a flask on a moving conveyor to be filled.

A further object of the invention is to provide improved mechanism for horizontally swinging a projector head, which is adjustable to vary the stroke of the head to correspond to flasks of different widths.

Other objects of the invention will appear from the detailed description.

The invention consists in the several novel features hereinafter set forth and more particularly defined by claims at the conclusion hereof.

In the drawings: Fig. 1 is a vertical section of a molding machine embodying the invention. Fig. 2 is a plan. Fig. 3 is a longitudinal section. Fig. 4 is a horizontal section showing the jib-operating mechanism. Fig. 5 is a transverse section through the jib-operating mechanism and the jib.

The invention is exemplified in a machine comprising a conveyor A for flasks $a$, and a sand projector B. The conveyor may be of any suitable type, such, for example, as an endless belt $a'$, carried by drums $a^2$ and $a^3$ and rollers $a^4$ for supporting the upper or working reach of the belt. Drum $a^3$ is driven by mechanism hereinafter described, to cause the belt to advance the flasks $a$ continuously under the sand projector.

The sand projector is mounted on a frame 10, which is arched to extend over the path of movement of the flasks $a$ on the conveyor. A socket 11 is fixedly supported on the frame 10, to serve as a pivotal support for the jib on which the projector head is mounted. The jib comprises a gear casing 12 provided with a depending spindle 13 which is journalled in the socket 10, and is carried by an anti-friction bearing $13^a$, so the jib may swing in a horizontal plane. The jib also comprises a tubular member 14, at the outer end of which the casing 15 of the projector is fixedly secured. An electric motor 16 is secured to the inner end of casing 12, and the shaft 17 of said motor extends through casing 12 and tubular member 14 into the projector casing where it is provided with a sand projector blade 18. Sand is fed into one side of the casing 15 by an endless belt 19 which is mounted at its inner end on a driven pulley 20, and at its outer end on an idler pulley 21. Pulley 20 is continuously driven by suitable gearing from the shaft 17. A hopper 22 is mounted on and to swing with the jib to direct sand from an overhead chute 23, onto the feed belt 19. The construction of the projector-head may be that set forth in Patent No. 1,667,097, and the gearing for driving the belt 19 may be of the construction set forth in Patent No. 1,408,493.

In filling flasks, more particularly those which are adapted to be filled by a single sweep of the projector head thereover, it has been found that the movement of the flask in one direction may be utilized with the swinging of the projector head transversely to the movement of the flasks, to fill all portions of the flasks, thus dispensing with the necessity of mounting the projector on an arm which is pivotally connected to the distal end of a horizontally swinging jib, and for this purpose mechanism is provided to swing the jib to move the projector head to discharge wads of sand at high velocity into the flasks during the swinging movements of the jib in a direction which is transverse to the direction of movement of the flasks. This mechanism comprises a continuously rotating disk 24 on a shaft 25 which is journalled in a housing 26, a link 27 which is pivoted to a wrist-pin 28 on the disk 24, and at 29, to the outer end of an arm 30 which is clamped by bolts 31 on the tubular member 17 of the jib. Wrist-pin 28 is slidably adjustable in a radial groove 32 in the disk 24, so that the operative stroke of the link 27 may be varied to produce movements of the projector which correspond substantially to flasks of different widths. For this purpose, this arm 30 is adjustably clamped on the tubular member 14, and a fork 34 is adjustably connected by a screw-thread and nut 35 to the link 27. By the adjustment of wrist-pin 28, the length of the stroke of the jib may be varied, and by adjustment of the arm 30, the range of movement may be varied.

Mechanism for driving the shaft 25 of disk 24 comprises a worm gear 37 fixed to said shaft, a worm 38 meshing with gear 37, and an electric motor 39, to the shaft of which worm 38 is secured. The motor shaft is journalled in bearings in the housing 26, and gear 37 and worm 38 are enclosed in said housing. Motor 29 is mounted on a bracket supported from housing 26.

In practice, it is important that the movement of the jib and conveyor be synchronized so that all portions of the flask will be filled with sand. For this purpose, the conveyor for the flask is driven by the motor 39 which operates the gearing for oscillating the jib which carries the projector-head. This gearing comprises a bevelled gear 41 fixed to the lower end of shaft 25, a bevelled gear 42 meshing with gear 41 and fixed to a shaft 43, a sprocket-wheel 44 fixed to shaft 43, a sprocket-chain 45 driven by said sprocket, and a sprocket-wheel 46 secured to the shaft of the driven pulley $a^3$ of the conveyor. This exemplifies mechanism by which the conveyor and the jib are synchronously operated, so that the movements of the flasks and the projector head will be coordinated to fill all portions of the flask. The speed of the conveyor relatively to the transverse movements of the projector-head may be varied by varying the ratio of gears 41 and 42 or by any other suitable means, and thus the mechanism will be adapted for filling molds of different depths.

The invention exemplifies a molding machine of the projector-type in which the movement of the flasks by a conveyor is utilized in connection with a swinging movement of the projector on a single jib, to fill all portions of a series of flasks, thus dispensing with the necessity of plural jibs or arms connected together. The invention also exemplifies mechanism for swinging the jib which is readily adjustable to vary its stroke and its range of movement; and also a machine in which the movements of the conveyor and the movements of the projector head are synchronized to cause all portions of the flasks to be filled.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In a molding machine, the combination of a supporting base; a jib pivoted on the base to swing horizontally; a sand-projector mounted on the jib; a motor for driving the projector, mounted on and to swing with the jib; means for delivering sand to said projector; and motor-driven mechanism for swinging the jib to move the projector over flasks, said mechanism being adjustable to vary the throw of the jib without interchange of any of the parts thereof.

2. In a molding machine, the combination of a supporting base; a jib pivoted on the base to swing horizontally; a sand-projector mounted on the jib; a motor for driving the projector, mounted on and to swing with the jib; means for delivering sand to said projector; and mechanism for swinging the jib to move the projector over flasks, comprising a stationary motor on the base.

3. In a molding machine, the combination of a supporting base; a jib pivoted on the base to swing horizontally; a sand-projector mounted on the jib; a motor for driving the projector, mounted on and to swing with the jib; means for delivering sand to said projector; and mechanism for swinging the jib to move the projector over flasks, comprising a stationary motor, gearing driven by said last mentioned motor, and a link actuated by the gearing and connected pivotally to the jib.

4. In a molding machine, the combination of a supporting base; a jib pivoted on the base to swing horizontally; a sand-projector mounted on the jib; a motor for driving the projector, mounted on and to swing with the jib; means for delivering sand to said projector; and mechanism for swinging the jib to move the projector over flasks, comprising a stationary motor in the base, a rotatable element driven by said last mentioned motor, and a connection between the jib and said element, said connection being adjustable so that the stroke of the jib may be varied.

5. In a molding machine, the combination of a supporting base; a jib pivoted on the base to swing horizontally; a sand-projector mounted on the jib; a motor for driving the projector, mounted on and to swing with the jib; means for delivering sand to said projector; and mechanism for swinging the jib to move the projector over flasks, comprising a stationary motor, speed reducing gearing driven by said last mentioned motor, a rotatable element driven by the gearing, and a link actuated by the element and connected pivotally to the jib.

6. In a molding machine, the combination of a supporting base; a jib pivoted on the base to swing horizontally; a sand-projector mounted on the jib; a motor for driving the projector, mounted on and to swing with the jib; means for delivering sand to said projector; and mechanism for swinging the jib to move the projector over flasks, comprising a stationary motor, speed reducing gearing driven by the last mentioned motor, a rotatable element driven by the gearing, and a link actuated by the element and connected pivotally to the jib, said link being adjustable so that the stroke of the jib may be varied.

7. In a molding machine, the combination of a supporting base; a jib pivoted on the base to swing horizontally; a sand-projector mounted on the jib; a motor for driving the projector, mounted to swing with the jib; means for delivering sand to said projector; and mechanism for oscillating the jib to move the projector over flasks, comprising a stationary motor, a rotatable element driven by the last mentioned motor, a link having one end thereof pivoted to the jib, and a connection between the element and the other end of the link, said connection being adjustable so that the throw of the jib may be varied.

8. In a molding machine, the combination of a supporting base; a jib pivoted on the base to swing horizontally, a sand-projector mounted on the jib; a motor for driving the projector, mounted on and to swing with the jib; means for delivering sand to said projector; and mechanism for oscillating the jib to move the projector over flasks, comprising a stationary motor, a rotatable element driven by the last mentioned motor, a link actuated by the element, and a pivotal connection between the link and the jib, said connection being adjustable with respect to the jib so that the range of movement of the projector may be varied.

9. In a molding machine, the combination of a supporting base provided at one side thereof with a housing; a jib pivoted on the base to swing horizontally; a sand-projector mounted on the jib; a motor for driving the projector, mounted on and to swing with the jib; means for delivering sand to said projector; and mechanism for oscillating the jib, comprising a stationary motor, speed reducing gearing disposed in the housing and driven by the last mentioned motor, a rotatable element driven by the gearing, and a link actuated by the element and connected pivotally to the jib.

10. In molding apparatus of the character described, the combination of a conveyor for flasks, a jib pivoted to swing transversely to the direction of travel of the flasks on the conveyor, a sand projector mounted on the jib, and mechanism for synchronously swinging the jib and operating the conveyor.

11. In molding apparatus of the character described, the combination of a conveyor for flasks, a jib pivoted to swing transversely to the direction of travel of the flasks on the conveyor, a sand projector mounted on the jib, a motor, mechanism driven by the motor, for swinging the jib, said mechanism being adjustable to vary the stroke of the jib, and gearing, driven by the motor, for driving the conveyor.

12. In molding apparatus of the character described, the combination of a conveyor adapted to carry flasks, a supporting structure, a sand-projector supported on the structure above the conveyor and so as to move transversely with respect to the flasks, motor-driven mechanism for moving the projector back and forth over the flasks, and mechanism for moving the conveyor so as to feed the flasks successively under the projector and cause, during operation and back and forth movement of the projector, all portions of the flasks to be filled with sand.

13. In molding apparatus of the character described, the combination of an endless conveyor adapted to carry flasks, a supporting structure positioned in close proximity to the conveyor, a sand-projector mounted on the structure above the conveyor and so as to move transversely with respect to the flasks, motor-driven mechanism for moving the projector back and forth over the flasks, and mechanism for driving the conveyor so as to feed the flasks successively under the projector and cause, during operation and back and forth movement of the projector, all portions of the flasks to be filled with sand.

14. In molding apparatus of the character described, the combination of a conveyor adapted to carry flasks, a supporting structure, a sand-projector mounted on the structure above the conveyor and so as to move transversely with respect to the flasks, mechanism for moving the projector back and forth over the flasks, mechanism for moving the conveyor so as to feed the flasks under the projector, and a motor for conjointly driving the two mechanisms.

15. In molding apparatus of the character described, the combination of a conveyor adapted to carry flasks, a supporting structure, a sand-projector mounted on the structure above the conveyor and so as to move transversely with respect to the flasks, motor-driven mechanism for moving the projector back and forth over the flasks, and mechanism for moving the conveyor so as to feed the flasks under the projector and cause, during operation and back and forth movement of said projector, all portions of the flasks to be filled with sand, the first mentioned mechanism being adjustable so that the stroke of the projector over the flasks may be varied.

16. In molding apparatus of the character described, the combination of an endless conveyor for feeding a series of flasks, a supporting structure, a jib supported by the structure over the conveyor and pivoted to swing in a horizontal plane and transversely with respect to the flasks, a sand-projector mounted on the jib, and power-driven mechanism for oscillating the jib so as to cause the projector to move back and forth over the conveyor and fill the flasks with sand during feed thereof.

Signed at Chicago, Illinois, this 12th day of October, 1928.

GEORGE FURMAN.